United States Patent
Shibahara

(10) Patent No.: US 12,495,467 B2
(45) Date of Patent: Dec. 9, 2025

(54) INFORMATION PROCESSING APPARATUS, INFORMATION PROCESSING SYSTEM, INFORMATION PROCESSING METHOD, AND NON-TRANSITORY COMPUTER-READABLE MEDIUM

(71) Applicant: NEC Corporation, Tokyo (JP)

(72) Inventor: Masaki Shibahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 273 days.

(21) Appl. No.: 18/276,782

(22) PCT Filed: Mar. 26, 2021

(86) PCT No.: PCT/JP2021/013098
§ 371 (c)(1),
(2) Date: Aug. 10, 2023

(87) PCT Pub. No.: WO2022/201542
PCT Pub. Date: Sep. 29, 2022

(65) Prior Publication Data
US 2024/0130004 A1    Apr. 18, 2024

(51) Int. Cl.
H04W 76/50    (2018.01)
H04M 15/00    (2006.01)
H04W 64/00    (2009.01)

(52) U.S. Cl.
CPC .......... *H04W 76/50* (2018.02); *H04M 15/39* (2013.01); *H04W 64/00* (2013.01)

(58) Field of Classification Search
CPC ....... H04W 76/50; H04W 64/00; H04W 4/24; H04M 15/00; H04M 15/39; H04M 15/8033; H04M 3/42
(Continued)

(56) References Cited

U.S. PATENT DOCUMENTS

2005/0079857 A1    4/2005   Umezawa et al.
2008/0139165 A1*   6/2008   Gage ................... H04W 76/50
                                                   455/414.1
(Continued)

FOREIGN PATENT DOCUMENTS

JP    S57-103466 A     6/1982
JP    2005-117570 A    4/2005
(Continued)

OTHER PUBLICATIONS

International Search Report for PCT Application No. PCT/JP2021/013098, mailed on Jun. 15, 2021.

*Primary Examiner* — Hirdepal Singh
(74) *Attorney, Agent, or Firm* — Sughrue Mion, PLLC

(57) ABSTRACT

An information processing apparatus (1) includes: an acquisition unit (11) that acquires information regarding a position of each of a plurality of communication terminals connected to a network; a first identification unit (12) that identifies a communication terminal located in a disaster region among the plurality of communication terminals as a first disaster response terminal based on an acquisition result; a second identification unit (13) that identifies a second disaster response terminal communicating with the first disaster response terminal based on a communication record; and a charging unit (14) that generates charging data for communication such that charging is not performed for communication from the first disaster response terminal and the second disaster response terminal.

8 Claims, 7 Drawing Sheets

(58) Field of Classification Search
USPC .................................................. 455/404.1
See application file for complete search history.

(56) References Cited

U.S. PATENT DOCUMENTS

| | | | | |
|---|---|---|---|---|
| 2015/0264547 | A1* | 9/2015 | Kobayashi | G08B 21/10 |
| | | | | 455/404.2 |
| 2015/0281934 | A1* | 10/2015 | Kawaguchi | H04W 4/02 |
| | | | | 370/259 |
| 2017/0039594 | A1* | 2/2017 | Shaw | G06Q 50/01 |
| 2018/0295522 | A1* | 10/2018 | Wong | H04W 16/14 |
| 2022/0022029 | A1* | 1/2022 | Di Girolamo | H04W 60/00 |
| 2022/0141637 | A1* | 5/2022 | Pellegrini | H04W 4/12 |
| | | | | 455/404.1 |
| 2022/0159560 | A1 | 5/2022 | Yanai et al. | |

FOREIGN PATENT DOCUMENTS

| | | |
|---|---|---|
| JP | 2007-181151 A | 7/2007 |
| JP | 2013-172184 A | 9/2013 |
| JP | 2015-215813 A | 12/2015 |
| JP | 2019-016963 A | 1/2019 |
| WO | WO-2017184676 A1 * 10/2017 ............. H04W 4/06 |
| WO | 2020/194940 A1 | 10/2020 |

\* cited by examiner

| USER | PRIORITY IN DISASTER | PROCESSING CONTENT |
|---|---|---|
| POLICE | 3 | PRIORITIZED |
| FIRE DEPARTMENT | 3 | PRIORITIZED |
| x x | 2 | SETTING OF BAND-LIMITATION |
| y y | 1 | NOT PERMITTED TEMPORARILY |

# INFORMATION PROCESSING APPARATUS, INFORMATION PROCESSING SYSTEM, INFORMATION PROCESSING METHOD, AND NON-TRANSITORY COMPUTER-READABLE MEDIUM

This application is a National Stage Entry of PCT/JP2021/013098 filed on Mar. 26, 2021, the contents of all of which are incorporated herein by reference, in their entirety.

TECHNICAL FIELD

The present invention relates to an information processing apparatus, an information processing system, an information processing method, and a non-transitory computer-readable medium, and more particularly, to an information processing apparatus, an information processing system, an information processing method, and a non-transitory computer-readable medium for performing charging processing for communication.

BACKGROUND ART

It has been proposed that networks operated by administrative organizations be integrated with private networks. Examples of the private networks include a carrier network and an advanced multichannel access (MCA) network. When charging is performed using private networks, whether to perform the charging can be set on a user basis by performing policy control in a policy and charging function (PCRF). For example, the PCRF can determine a charging policy for each user (for example, a charging plan to which the user subscribes) and perform charging control on the user.

Patent Literature 1 discloses a technique for reducing or eliminating call charges between communication terminals belonging to a specific base station.

CITATION LIST

Patent Literature

Patent Literature 1: Japanese Unexamined Patent Application Publication No. 2005-117570

SUMMARY OF INVENTION

Technical Problem

When a disaster occurs, it is considered that charging should not be performed on communication terminals that are performing disaster response. The PCRF can perform control based on a preset charging policy on a user basis, but has a problem that other information cannot be taken into consideration.

The present disclosure has been devised to solve such a problem, and an object of the present disclosure is to provide an information processing apparatus, an information processing system, an information processing method, and a non-transitory computer-readable medium for performing an appropriate charging process according to whether a communication terminal is performing disaster response.

Solution to Problem

According to a first aspect of the present disclosure, an information processing apparatus includes:

acquisition means for acquiring information regarding a position of each of a plurality of communication terminals connected to a network;

first identification means for identifying a communication terminal located in a disaster region among the plurality of communication terminals as a first disaster response terminal based on an acquisition result;

second identification means for identifying a second disaster response terminal communicating with the first disaster response terminal based on a communication record; and charging means for generating charging data for communication such that charging is not performed for communication from the first disaster response terminal and the second disaster response terminal.

According to a second aspect of the present disclosure, an information processing system includes:

a plurality of communication terminals connected to a network; and an information processing apparatus.

The information processing apparatus acquires information regarding a position of each of the plurality of communication terminals, identifies a communication terminal located in a disaster region among the plurality of communication terminals as a first disaster response terminal based on an acquisition result, identifies a second disaster response terminal communicating with the first disaster response terminal based on a communication record, and generates charging data for communication such that charging is not performed for communication from the first disaster response terminal and the second disaster response terminal.

According to a third aspect of the present disclosure, an information processing method includes:

by a computer, acquiring information regarding a position of each of a plurality of communication terminals connected to a network;

identifying a communication terminal located in a disaster region among the plurality of communication terminals as a first disaster response terminal based on an acquisition result;

identifying a second disaster response terminal communicating with the first disaster response terminal based on a communication record; and generating charging data for communication such that charging is not performed for communication from the first disaster response terminal and the second disaster response terminal.

According to a fourth aspect of the present disclosure, a non-transitory computer-readable medium stores a program causing a computer to perform:

a process of acquiring information regarding a position of each of a plurality of communication terminals connected to a network;

a process of identifying a communication terminal located in a disaster region among the plurality of communication terminals as a first disaster response terminal based on an acquisition result;

a process of identifying a second disaster response terminal communicating with the first disaster response terminal based on a communication record; and a process of generating charging data for communication such that charging is not performed for communication from the first disaster response terminal and the second disaster response terminal.

Advantageous Effects of Invention

According to the present disclosure, it is possible to provide an information processing apparatus, an information processing system, an information processing method, and a non-transitory computer-readable medium for performing an appropriate charging process according to whether a communication terminal is performing disaster response.

EXAMPLE EMBODIMENT

Figure 1:
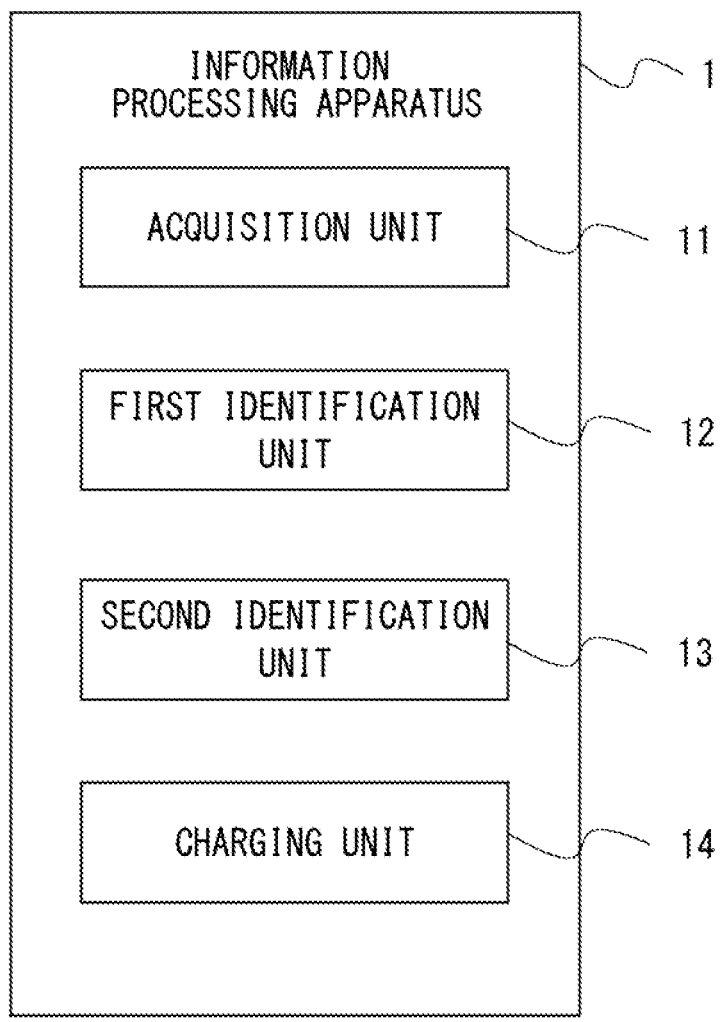
FIG. 1 is a block diagram illustrating an overall configuration of an information processing apparatus according to a first example embodiment.

Hereinafter, example embodiments of the present disclosure will be described in detail with reference to the drawings. In the drawings, the same or corresponding elements are denoted by the same reference numerals, and repeated description will be omitted as necessary for clarifying description.

First Example Embodiment

FIG. 1 is a block diagram illustrating an overall configuration of an information processing apparatus 1 according to a first example embodiment. The information processing apparatus 1 is a computer that performs an appropriate charging process according to whether a communication terminal is performing disaster response. For example, the information processing apparatus 1 performs a charging process on a communication terminal operated by an administrative organization such as a police department or a fire department.

The communication terminal is connected to a network (not illustrated). The network (not shown) may be a network for public safety. The network for public safety is, for example, a public safety (PS)-Long Term Evolution (LTE) network. The network for public safety may be implemented by a technique other than LTE. The information processing apparatus 1 may be included in a network (not illustrated).

A plurality of communication terminals may include communication terminals for a site and communication terminals for a command unit. Each of the plurality of communication terminals may perform an input to the information processing apparatus 1 and perform a process in response to an output from the information processing apparatus 1.

The information processing apparatus 1 includes an acquisition unit 11, a first identification unit 12, a second identification unit 13, and a charging unit 14. The acquisition unit 11 acquires information regarding a position of each of a plurality of communication terminals connected to a network (not illustrated). The information regarding the position of each communication terminal may be Global Positioning System (GPS) positional information or identification information of a base station to which each communication terminal is connected. The information processing apparatus 1 may acquire information regarding the position of each terminal from a storage apparatus in which the information regarding the position of each terminal is recorded.

A disaster may be caused due to rain or snow or may be caused due to an earthquake. The disaster may be a man-made disaster such as an accident.

The first identification unit 12 identifies a communication terminal located in a disaster region among a plurality of communication terminals connected to a network (not illustrated) as a first disaster response terminal based on an acquisition result of the acquisition unit 11. It is assumed that the first identification unit acquires information regarding a region where the disaster has occurred (a disaster region).

The second identification unit 13 identifies a second disaster response terminal communicating with the first disaster response terminal based on a communication record. Here, the second disaster response terminal may be a communication terminal for a command unit located in the command center. For example, the second identification unit 13 may identify the second disaster response terminal that performs a group call with the first disaster response terminal based on a record of the group call.

The charging unit 14 generates charging data for communication so that charging is not performed for communication from the first and second disaster response terminals. The charging may be performed in accordance with a communication volume, or may be performed in accordance with a call time. The generation of the charging data is also referred to as a charging process. The charging data may be updated (generated) whenever communication is performed, or may be performed periodically.

Figure 2:
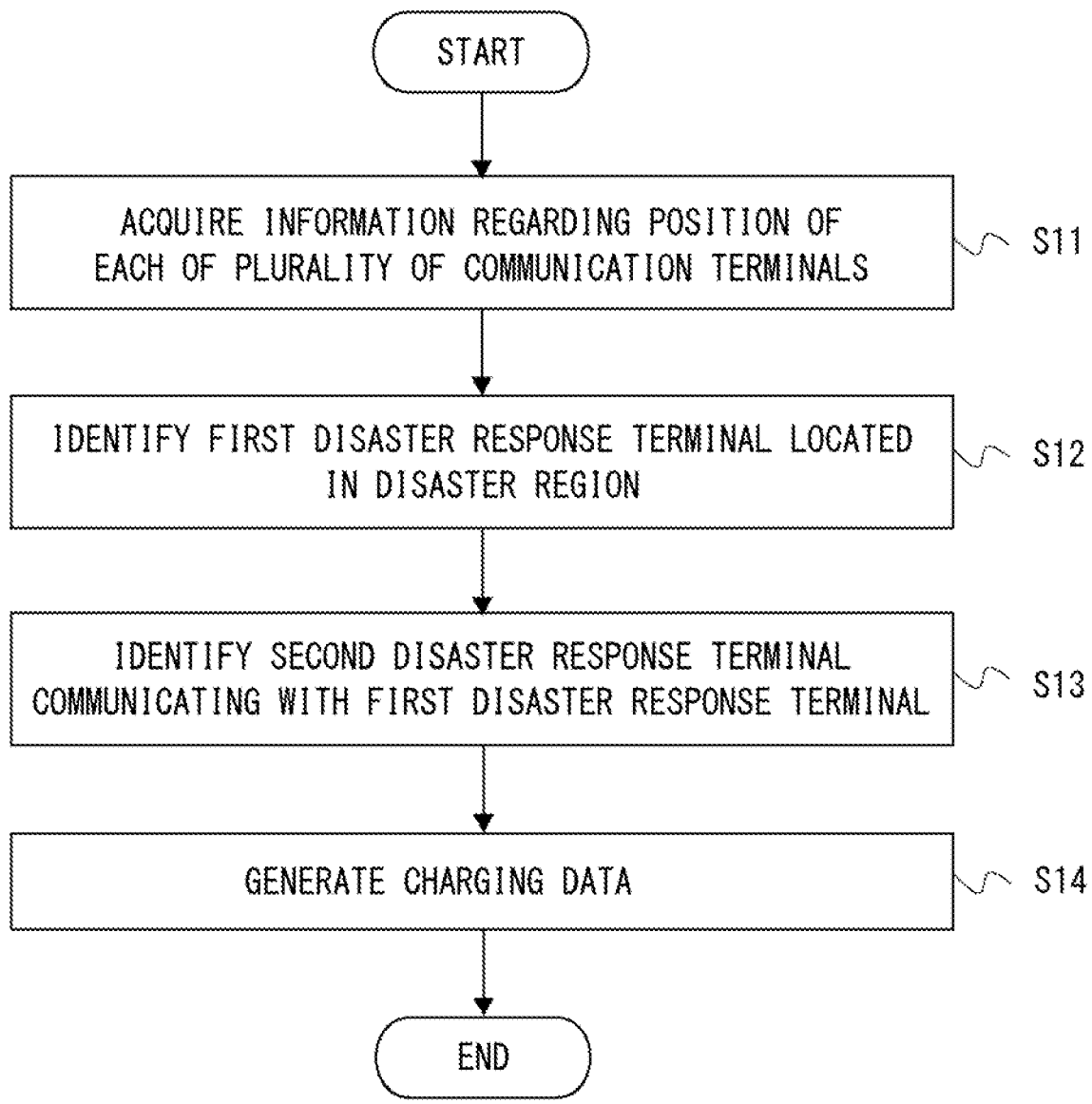
FIG. 2 is a flowchart illustrating a flow of an information processing method according to the first example embodiment.

FIG. 2 is a flowchart illustrating a flow of an information processing method according to the first example embodiment. It is assumed that a region where a disaster occurs has been identified. First, the acquisition unit 11 of the information processing apparatus 1 acquires information regarding the position of each of a plurality of communication terminals connected to a network (not illustrated) (S11). Subsequently, the first identification unit 12 of the information processing apparatus 1 identifies the first disaster response terminal that is performing the disaster response among the plurality of communication terminals based on the information acquired in step S11 (S12).

Subsequently, the second identification unit 13 of the information processing apparatus 1 identifies the second disaster response terminal communicating with the first disaster response terminal identified in step S12 based on a communication record (S13). Finally, the charging unit 14 of the information processing apparatus 1 generates charging data for the communication so that the communication from the first disaster response terminal identified in step S12 and the second disaster response terminal specified in step S13 is not charged (S14).

As described above, the information processing apparatus according to the example embodiment identifies the first disaster response terminal located in the disaster region and the second disaster response terminal communicating with the first disaster response terminal, and performs a charging process based on an identification result. Accordingly, the information processing apparatus 1 according to the example embodiment can generate appropriate charging data so that a communication terminal performing disaster response is not charged.

The information processing apparatus 1 includes a processor, a memory, and a storage apparatus as a configuration (not illustrated). The storage apparatus stores a computer program in which a process of the information processing method according to the example embodiment is implemented. Then, the processor reads a computer program from the storage apparatus into the memory and executes the computer program. Accordingly, the processor implements functions of the acquisition unit 11, the first identification unit 12, the second identification unit 13, and the charging unit 14.

Alternatively, each of the acquisition unit 11, the first identification unit 12, the second identification unit 13, and the charging unit 14 may be implemented by dedicated hardware. Some or all of the constituent of the apparatuses may be implemented by general-purpose or dedicated circuitry, a processor, or the like, or a combination thereof. These constituents may be configured by a single chip or may be configured by a plurality of chips connected via a bus. Some or all of the constituents of the apparatuses may be implemented by a combination of the above-described circuit or the like and a program. A central processing unit (CPU), a graphics processing unit (GPU), a field-programmable gate array (FPGA), a quantum processor (quantum computer control chip), or the like can be used as the processor.

When some or all of the constituents of the information processing apparatus 1 are implemented by a plurality of information processing apparatuses, circuits, or the like, the plurality of information processing apparatuses, circuits, or the like may be centralized or distributed. For example, the information processing apparatuses, the circuits, and the like may be implemented as a form of a client server system and a cloud computing system in which they are connected via a communication network. The functions of the information processing apparatus 1 may be provided in software as a service (SaaS) format.

Second Example Embodiment

Figure 3:
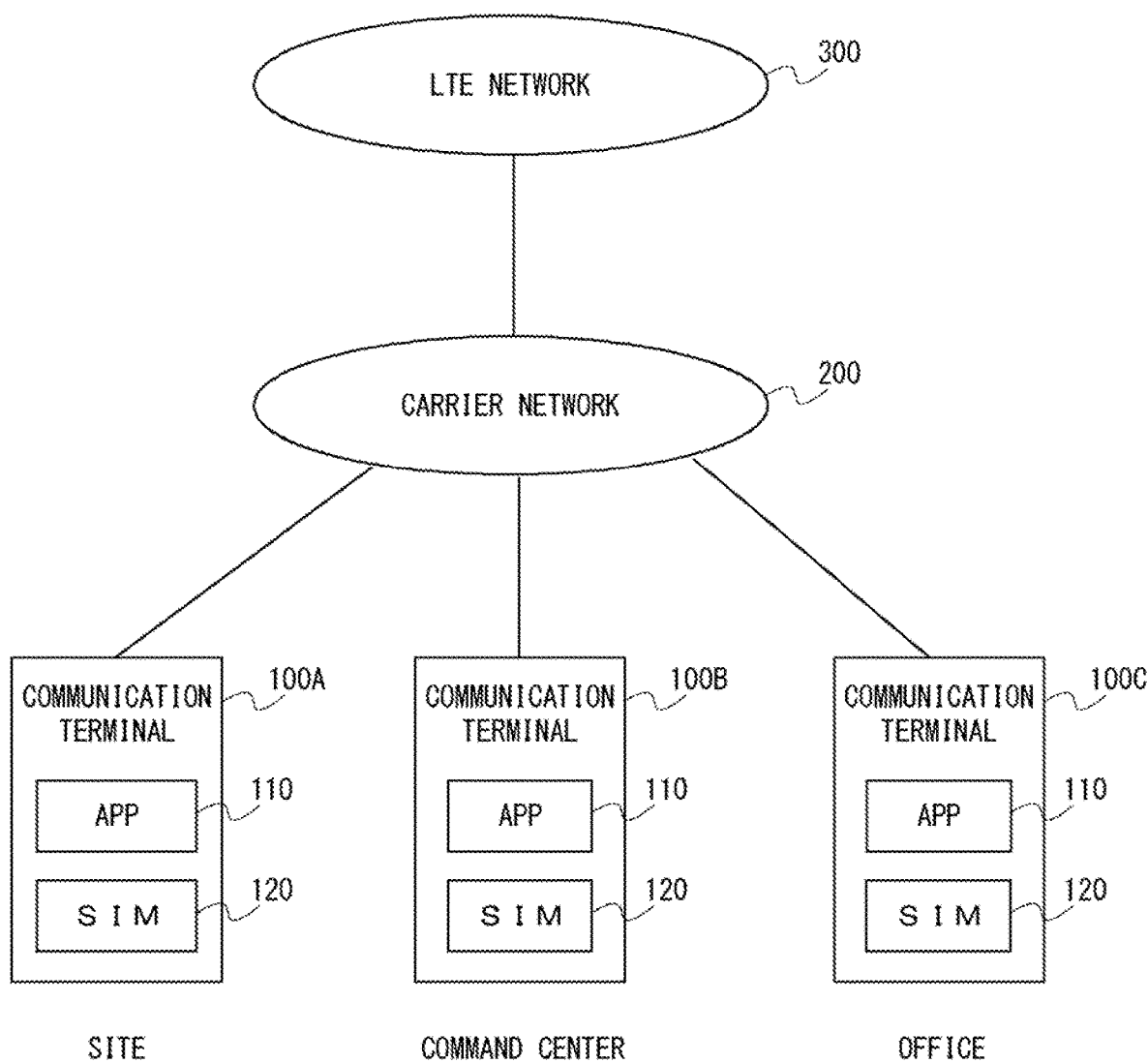
FIG. 3 is a block diagram illustrating a configuration example of an information processing system according to a second example embodiment.

A second example embodiment is a specific example of the above-described first example embodiment. FIG. 3 is a block diagram illustrating a configuration example of an information processing system 1000 according to the second example embodiment. The information processing system 1000 is a system that appropriately charges a communication terminal operated by an administrative organization such as a police department or a fire department. The administrative organization is not limited to the police department or the fire department, and may be the Ministry of Defense, a local government, or a medical administrative organization.

The information processing system 1000 includes a communication terminal 100A, a communication terminal 100B, a communication terminal 100C, a carrier network 200, and an LTE network 300. The communication terminal 100A, the communication terminals 100B, and 100C can communicate with each other via the carrier network 200 and the LTE network 300. The LTE network 300 is specifically a PS-LTE network.

The communication terminal 100A, the communication terminal 100B, and the communication terminal 100C are operated by an administrative organization such as a police department or a fire department. The communication terminal 100A, the communication terminal 100B, and the communication terminal 100C may be general-purpose communication terminals such as smartphones or may be dedicated wireless apparatuses. In the communication terminal 100A, the communication terminal 100B, and the communication terminal 100C, an application (app) 110 for communication is operated. A subscriber identity module (SIM) card 120 is attached to each of the communication terminals 100A, 100B, and 100C.

The communication terminal 100A is, for example, a communication terminal for a site used in the site. The communication terminal 100B is, for example, a communication terminal for a command unit used in a command center. The communication terminal 100C is, for example, a communication terminal for an office used in the office.

The number of communication terminals 100A for the site may be plural. The number of communication terminals 100C and the number of communication terminals 100B for the command unit may be plural. Hereinafter, when the communication terminals 100A, 100B, and 100C are not distinguished from each other, the communication terminals 100A, 100B, and 100C are simply referred to as communication terminals 100.

The information processing system 1000 does not necessarily include the above-described three types of communication terminals 100 used in a site, a command unit, and an office. The number of types of communication terminals 100 may be two or one.

The carrier network 200 is a network operated by a carrier. Details of the configuration of the carrier network 200 will be described below. The LTE network 300 is connected to the carrier network 200 and has a function of generating charging data for communication from the communication terminal 100. Here, the LTE network 300 identifies, as the first disaster terminal, a communication terminal located in a disaster region among the plurality of communication terminals 100. Then, the LTE network 300 identifies a second disaster response terminal communicating with the first disaster response terminal among the plurality of communication terminals 100. The LTE network 300 generates charging data so that communication from the identified disaster response terminals are not charged. Details of the configuration of the LTE network 300 will be described below.

Figure 4:
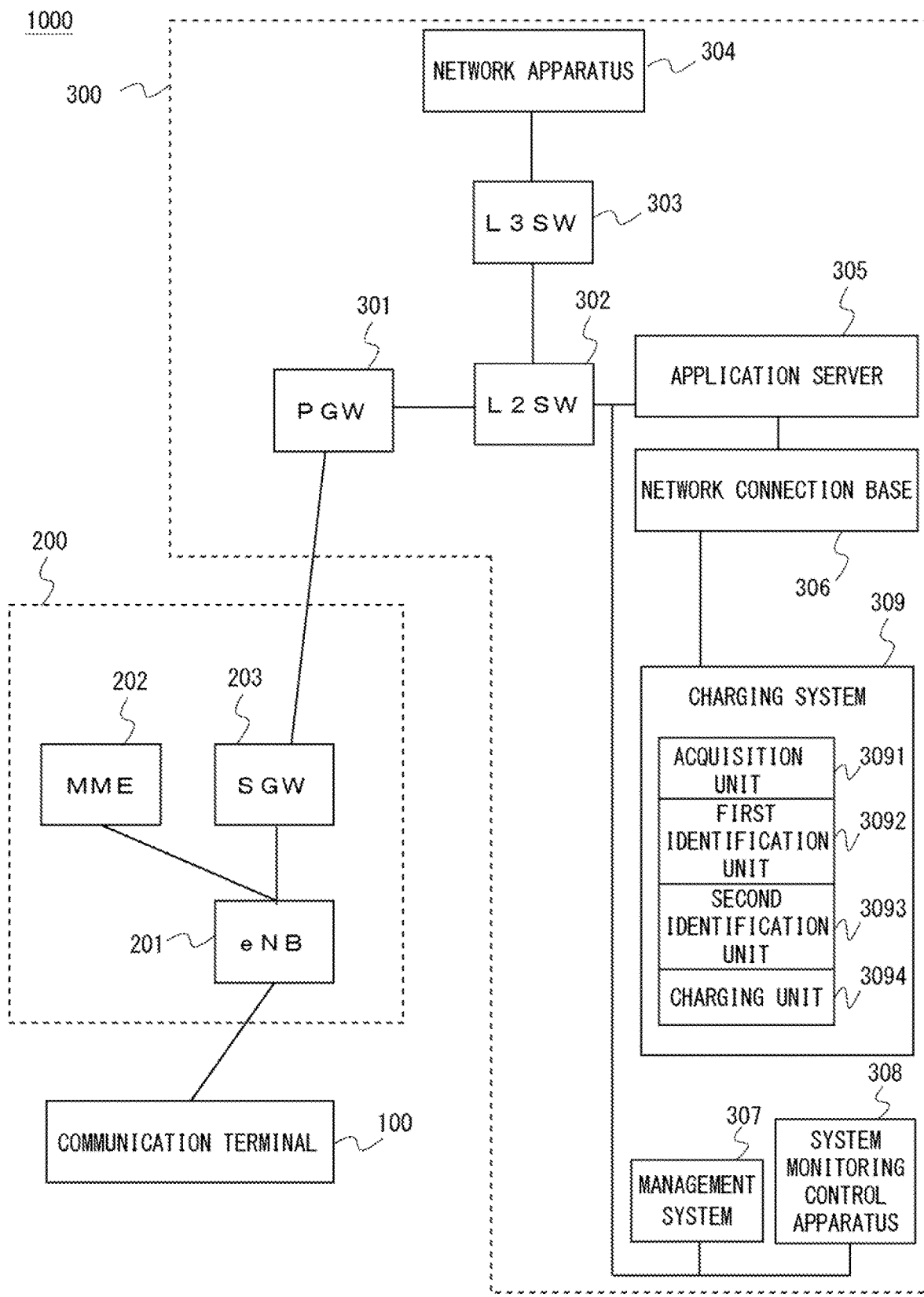
FIG. 4 is a block diagram illustrating a detailed configuration of a network according to the second example embodiment.

Next, the configurations of the carrier network 200 and the LTE network 300 will be described in detail with reference to FIG. 4. The carrier network 200 includes an evolved node B (eNB) 201, a mobility management entity (MME) 202, and a serving gateway (SGW) 203. The eNB 201 is also referred to as a base station. The MME 202 exchanges control information with the eNB 201. The SGW 203 receives data from the communication terminal 100 via the eNB 201 and transmits the data to a packet data network gateway (PGW) 301 of the LTE network 300.

The LTE network 300 includes a PGW 301, a layer 2 switch (L2SW) 302, a layer 3 switch (L3SW) 303, a network apparatus 304, an application server 305, a network connection base 306, a management system 307, a system monitoring control apparatus 308, and a charging system 309. The PGW 301 is also referred to as a PS-LTE PGW.

The application server 305 includes, for example, a push to talk (PTT) server, a moving-image transmission server, and a chat server. Here, the PTT server may be operated by housing, and the moving-image transmission server and the chat server may be operated on a cloud as a virtual machine (VM). Here, the PTT server stores a call or group call history between the communication terminals 100. The call history includes, for example, information regarding a source and a destination, and a call time. The group call history includes, for example, information regarding the communication terminal 100 registered as a group and a call time.

The network connection base 306 includes, for example, a network server and a group communication application server. Here, the network server may be operated by housing, and the group communication application server may be operated on a cloud as a VM. The network connection base 306 may include, for example, a session initiation protocol (SIP) server. The network connection base 306 and the application server 305 may be wirelessly interconnected via an interface.

The management system 307 manages communication between the plurality of communication terminals 100. The management system 307 normally does not permit communication between the communication terminal 100 operated by a police and the communication terminal 100 operated by a fire department. However, when a disaster occurs, the management system 307 permits communication between the communication terminal 100 operated by the police and the communication terminal 100 operated by the fire department. Communication management and communication control (priority control or the like) are not necessarily performed by the management system 307 and may be performed by the application server 305 or the network connection base 306.

The system monitoring control apparatus 308 monitors communication between the plurality of communication terminals 100. The system monitoring control apparatus 308 may periodically check an operating status of the system.

The charging system 309 is an example of the above-described information processing apparatus 1. The charging system 309 includes an acquisition unit 3091, a first identification unit 3092, a second identification unit 3093, and a charging unit 3094.

The acquisition unit 3091 is an example of the above-described acquisition unit 11. The acquisition unit 3091 acquires information regarding a position of the communication terminal 100. Here, the communication terminal 100 may transmit identification information of the belonging eNB 201 to the LTE network 300. The communication terminal 100 may periodically transmit GPS positional information of the communication terminal 100 to the LTE network 300.

The first identification unit 3092 is an example of the above-described first identification unit 12. The first identification unit 3092 identifies the first disaster response terminal located in the disaster region based on an acquisition result of the acquisition unit 3091. In the case of FIG. 3, the first identification unit 3092 identifies the communication terminal 100A as the first disaster response terminal. The first identification unit 3092 may acquire information regarding the disaster region from the Internet or the like and identify the first disaster response terminal located in the disaster region. The disaster region may be a disaster relief operation target region. The communication terminal 100C lent to the site from an office may be identified as the first disaster response terminal.

The second identification unit 3093 is an example of the above-described second identification unit 13. The second identification unit 3093 identifies the second disaster response terminal communicating with the first disaster response terminal based on the communication record. The second identification unit 3093 may identify the second disaster response terminal based on a call record made between the communication terminals 100, or may identify the second disaster response terminal based on records of group calls made by the plurality of communication terminals 100. Here, the call record may be obtained from the PTT server. In the case of FIG. 3, the second identification unit 3093 identifies the communication terminal 100B as the second communication terminal. In this way, the second identification unit 3093 can identify the second communication terminal that belongs to the same group as the first disaster response terminal and is not present at the disaster site. The communication record is not limited to the call record, and may be a record of data communication other than voice communication.

The charging unit 3094 is an example of the above-described charging unit 14. The charging unit 3094 generates data (charging data) for charging for communication between the plurality of communication terminals 100. Here, the charging unit 3094 generates the charging data so that the communication from the first disaster response terminal identified by the first identification unit 3092 is not charged. Further, the charging unit 3094 generates the charging data so that the communication from the second disaster response terminal identified by the second identification unit 3093 is not charged.

Therefore, in the case of FIG. 3, charging is not performed for the communication from the communication terminal 100A for the site and the communication terminal 100B for the command unit, and charging is performed for the communication from the communication terminal 100C for the office. As described above, the information processing system 1000 can perform control such that charging is not performed on the communication terminal 100 performing disaster response.

Figures 5, 6:
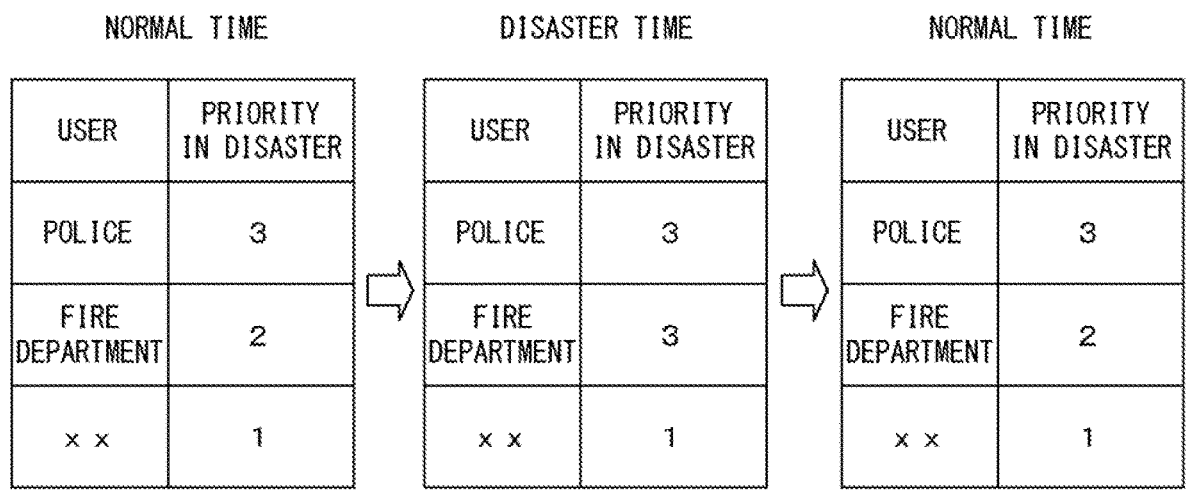
FIG. 5 is a schematic diagram illustrating a priority setting example in the information processing system in a disaster according to the second example embodiment.
FIG. 6 is a schematic diagram illustrating a change of the priority in the information processing system according to the second example embodiment.

When a disaster occurs, the management system 307 may change priority set in each communication terminal 100. FIG. 5 is a schematic diagram illustrating a setting example of priority in a disaster of the information processing system 1000. In FIG. 5, priority level 3 is set for the police and the fire department. Priority of an organization other than the police and the fire department may be set to, for example, level 2. Communication from the communication terminal 100 set to level 3 is prioritized, and communication from the communication terminal 100 set to level 2 is band-limited. Communication from the communication terminal 100 set to level 1 is temporarily not permitted. As described above, communication management and communication control (priority control or the like) are not necessarily performed by the management system 307, and can be performed by the application server 305 or the network connection base 306.

FIG. 6 is a schematic diagram illustrating a change in priority of the information processing system 1000. First, in a normal time, the priority of the police is set to level 3, and the priority of the fire department is set to level 2. Here, when a disaster occurs, the charging system 309 sets the priority of the fire department to level 3. Accordingly, the information processing system 1000 can promote cooperation between the police and the fire department in a disaster time. After a disaster response is completed, the management system 307 returns the priority setting to the original setting.

The charging system 309 performs control such that a class is changed among the communication terminal 100A for the site, the communication terminal 100B for the command unit, and the communication terminal 100C for the office in the disaster time. For example, the charging system 309 may perform a process of raising the priority of the communication terminal 100C for the office in disaster time. Accordingly, the information processing system 1000 can promote disaster response by lending the communication terminal 100C for the office to the disaster site.

Figure 7:
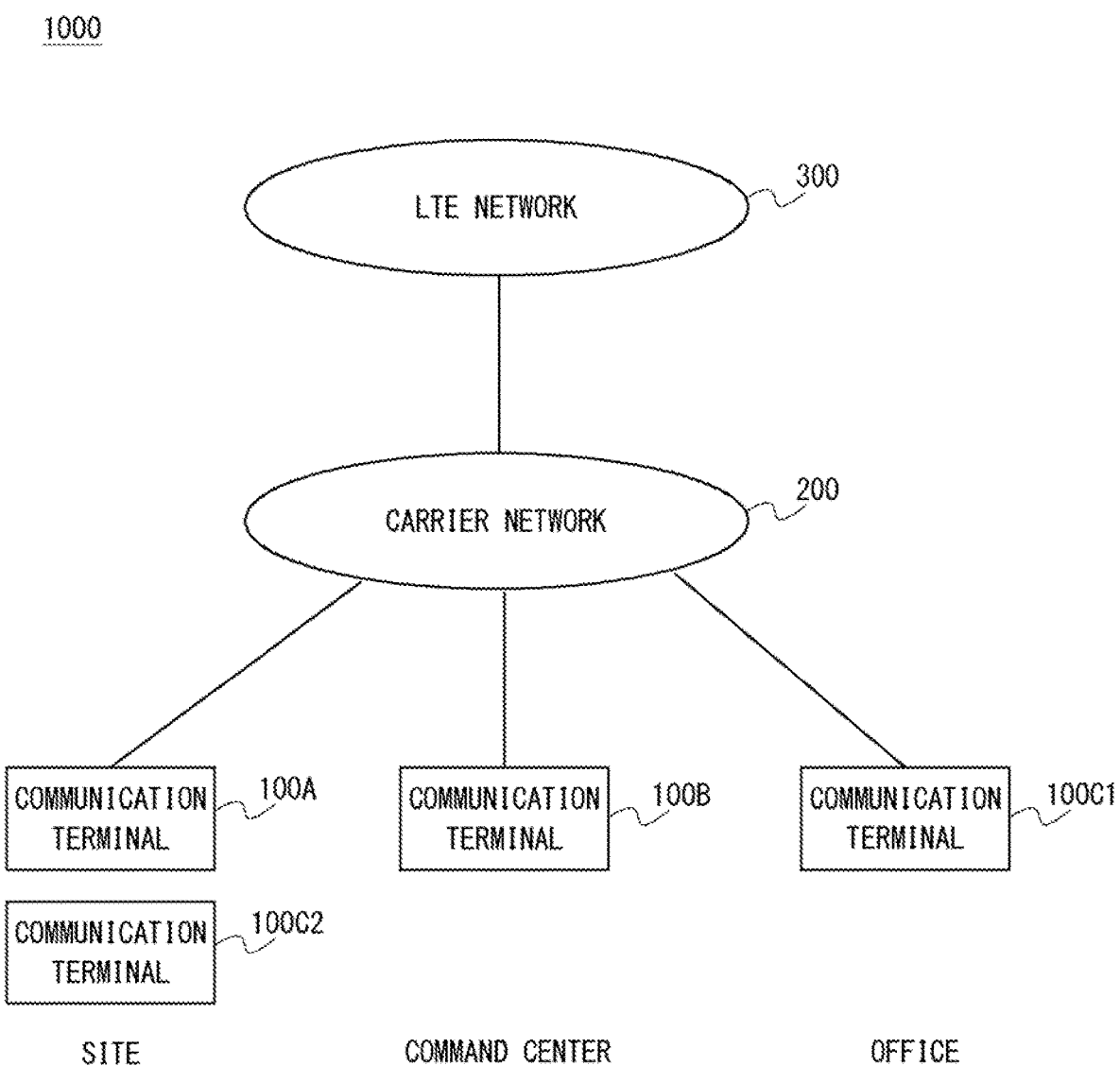
FIG. 7 is a block diagram of the information processing system in a case where a communication terminal for an office is lent out to a site according to the second example embodiment.

FIG. 7 illustrates a block diagram in a case where the communication terminal 100C2 between the communication terminals 100C1 and 100C2 for the office is lent out to the site. In such a case, the communication terminal 100C2 lent to the site is identified as the first disaster response terminal. On the other hand, since the communication terminal 100C1 is located in the office that is a site other than a disaster site, the communication terminal 100C1 is not identified as the first disaster response terminal. When there is no communication with the site, the communication terminal 100C1 is not identified as the second disaster response terminal either. Therefore, in the case of FIG. 7, charging is performed for the communication from the communication terminal 100C1, and charging is not performed for the communication from the communication terminal 100C2.

The charging unit 3094 may not perform charging when the communication terminal 100C for the office performs communication on the site for a training or the like. In this way, when the communication terminal 100A for the site, the communication terminal 100B for the command unit, and the communication terminal 100C for the office are used for different purposes, the charging unit 3094 may not perform charging. That is, when the charging system 309 temporarily communicates with the communication terminal 100 of another plan (for example, when the communication terminal 100C for the office communicates with the communication terminal 100B for the command unit), the charging may not be performed.

Figure 8:
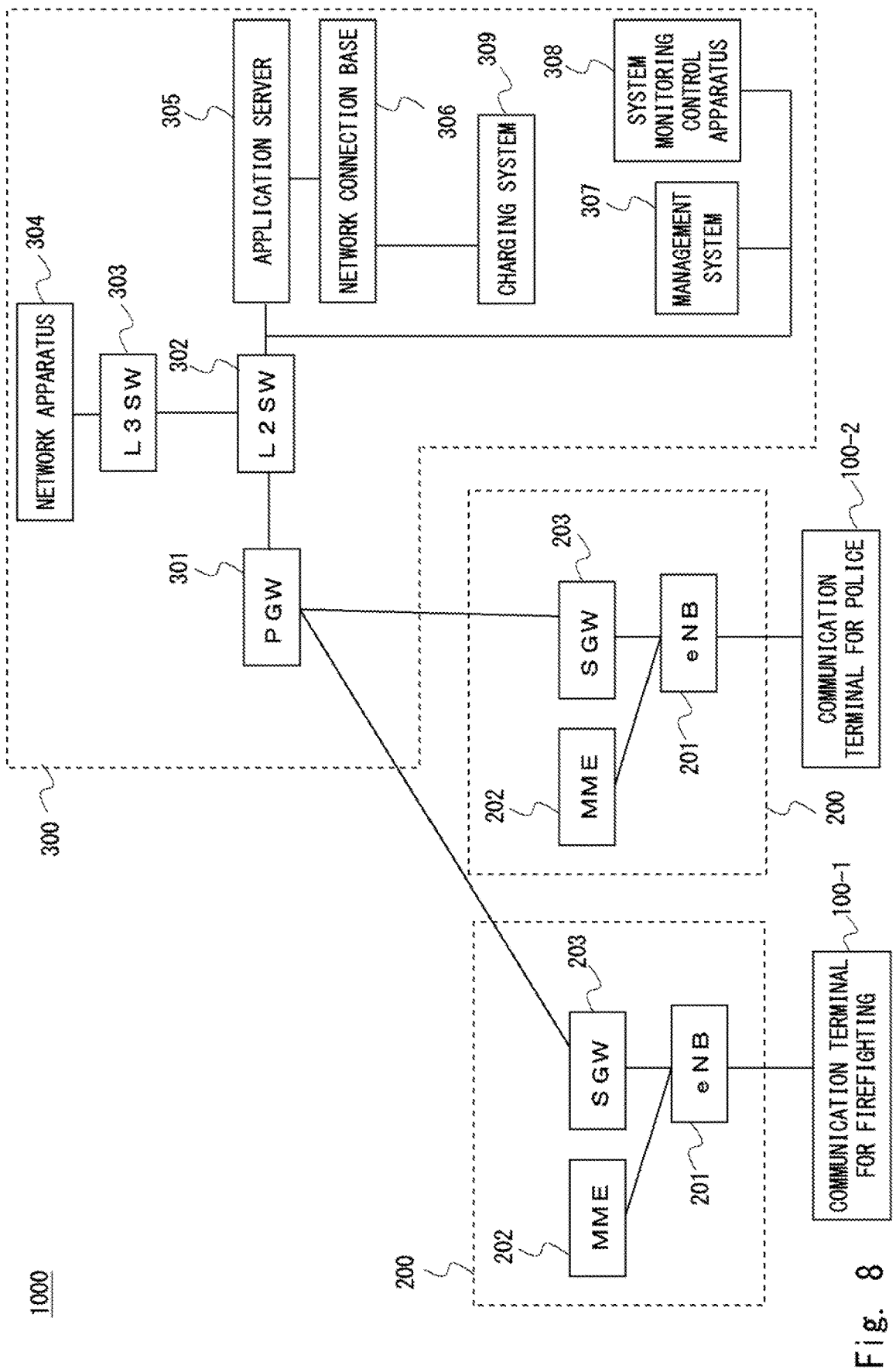
FIG. 8 is a block diagram illustrating a configuration example of an information processing system according to the second example embodiment.

Next, an operation of the information processing system 1000 in a normal state and an operation at an emergency time (disaster time) will be described with reference to FIG. 8. FIG. 8 is a block diagram illustrating a configuration example of the information processing system 1000. A communication terminal 100-1 for firefighting is a communication terminal 100 operated in a fire department, and a communication terminal 100-2 for police is a communication terminal 100 operated in the police.

Here, at a normal time, the communication terminal 100-1 for firefighting communicates with another communication terminal 100 operated in the fire department. The communication terminal 100-2 for police communicates with another communication terminal 100 operated in the police. That is, normally, the fire department and the police communicate individually and do not cooperate with each other. The charging system 309 charges for communication from the communication terminal 100-1 for firefighting or the communication terminal 100-2 for police. The charging may be a flat rate, a stepwise flat rate, or a metered rate.

When a disaster occurs, the management system 307 permits communication between the communication terminal 100-1 for firefighting and the police communication terminal 100-2 for police. In such a case, the charging system 309 may not charge for communication from the communication terminal 100-1 for firefighting or the communication terminal 100-2 for police. At a disaster time, the fire department and the police can communicate in cooperation.

As described above, when the communication terminal 100-1 for firefighting and the communication terminal 100-2 for police are located in the disaster site, the charging system 309 does not charge for communication from the communication terminal 100-1 for firefighting and the communication terminal 100-2 for police. The positions of the communication terminal 100-1 for firefighting and the communication terminal 100-2 for police are acquired from, for example, an identifier of a connected base station (eNB 201) and positional information such as GPS.

Finally, advantageous effects achieved by the information processing apparatus according to the second example embodiment will be described. In a related technique, charging is performed on a user basis using a PCRF. Here, the PCRF can set whether to perform charging on a user basis, but cannot consider positional information and a communication record (for example, a call record). Accordingly, according to the related technique, there is a problem that it is difficult to perform control without charging the user in the disaster site.

The information processing apparatus according to the second example embodiment identifies a communication terminal (first disaster response terminal) performing site response in a disaster site from positional information. The information processing apparatus according to the second example embodiment identifies a communication terminal (second disaster response terminal) for a command unit communicating with a communication terminal (first disaster response terminal) that performing site response in a disaster site based on a communication record. The information processing apparatus according to the second example embodiment does not perform a charging process for the communication from the communication terminal performing the disaster response. Accordingly, the information processing apparatus according to the second example embodiment can identify a user performing disaster response in the site, a command center away from the site, or the like, and a user who is not performing the disaster response, and can determine presence or absence of charging.

In the above-described example, the program can be stored using any of various types of non-transitory computer-readable media to be supplied to a computer. The non-transitory computer-readable media include various types of tangible storage media. Examples of the non-transitory computer-readable media include a magnetic recording medium (for example, a flexible disk, a magnetic tape, or a hard disk drive), a magneto-optical recording medium (for example, a magneto-optical disc), a CD-read only memory (CD-ROM), a CD-R, a CD-R/W, a digital versatile disc (DVD), and a semiconductor memory (for example, mask ROM, a programmable ROM (PROM), an erasable PROM (EPROM), a flash ROM, and a random access memory (RAM)). The program may be supplied to the computer by any of various types of transitory computer-readable media. Examples of the transitory computer-readable media include electrical signals, optical signals, and electromagnetic waves. The transitory computer-readable medium may supply the program to the computer via a wired communication path such as an electric wire and an optical fiber, or a wireless communication path.

The present disclosure is not limited to the above example embodiments, and can be appropriately changed without departing from the gist of the present disclosure. The present disclosure may be implemented by appropriately combining the respective example embodiments.

Although the present invention has been described above with reference to the example embodiments, the present invention is not limited to the above-described example embodiments. Various changes that can be understood by those skilled in the art can be made to the configuration and details of the present invention within the scope of the present invention.

REFERENCE SIGNS LIST

1 INFORMATION PROCESSING APPARATUS
11 ACQUISITION UNIT
12 FIRST IDENTIFICATION UNIT
13 SECOND IDENTIFICATION UNIT
14 CHARGING UNIT
1000 INFORMATION PROCESSING SYSTEM
100, 100A, 100B, 100C, 100C1, 100C2 COMMUNICATION TERMINAL
100-1 FIRE-FIGHTING COMMUNICATION TERMINAL
100-2 POLICE COMMUNICATION TERMINAL
110 APPLICATION
120 SIM
200 CARRIER NETWORK
201 eNB
202 MME
203 SGW
300 LTE NETWORK
301 PGW
302 L2SW
303 L3SW
304 NETWORK APPARATUS
305 APPLICATION SERVER
306 NETWORK CONNECTION BASE
307 MANAGEMENT SYSTEM
308 SYSTEM MONITORING CONTROL APPARATUS
309 CHARGING SYSTEM
3091 ACQUISITION UNIT
3092 FIRST IDENTIFICATION UNIT
3093 SECOND IDENTIFICATION UNIT
3094 CHARGING UNIT

What is claimed is:

1. An information processing apparatus comprising:
at least one memory storing instructions; and
at least one processor configured to execute the instructions to:
acquire information regarding a position of each of a plurality of communication terminals connected to a network;
identify a communication terminal located in a disaster region among the plurality of communication terminals as a first disaster response terminal based on an acquisition result;
identify a second disaster response terminal communicating with the first disaster response terminal based on a communication record; and
generate charging data for communication such that charging is not performed for communication from the first disaster response terminal and the second disaster response terminal.

2. The information processing apparatus according to claim 1, wherein the at least one processor is further configured to execute the instructions to acquire Global Positioning System (GPS) positional information from each of the plurality of communication terminals.

3. The information processing apparatus according to claim 1, wherein the at least one processor is further configured to execute the instructions to acquire identification information of a base station to which each of the plurality of communication terminals is connected.

4. The information processing apparatus according to claim 1, wherein the at least one processor is further configured to execute the instructions to identify the second disaster response terminal that performs a group call with the first disaster response terminal based on a record of the group call.

5. The information processing apparatus according to claim 1, wherein
the first disaster response terminal is a communication terminal for a site, and
the second disaster response terminal is a communication terminal for a command unit.

6. The information processing apparatus according to claim 1, wherein the network is a public safety (PS)-Long Term Evolution (LTE) network.

7. An information processing method comprising:
by a computer,
acquiring information regarding a position of each of a plurality of communication terminals connected to a network;
identifying a communication terminal located in a disaster region among the plurality of communication terminals as a first disaster response terminal based on an acquisition result;
identifying a second disaster response terminal communicating with the first disaster response terminal based on a communication record; and
generating charging data for communication such that charging is not performed for communication from the first disaster response terminal and the second disaster response terminal.

8. A non-transitory computer-readable medium that records an information processing program causing a computer to perform:
a process of acquiring information regarding a position of each of a plurality of communication terminals connected to a network;
a process of identifying a communication terminal located in a disaster region among the plurality of communication terminals as a first disaster response terminal based on an acquisition result;
a process of identifying a second disaster response terminal communicating with the first disaster response terminal based on a communication record; and
a process of generating charging data for communication such that charging is not performed for communication from the first disaster response terminal and the second disaster response terminal.

* * * * *